of
United States Patent
Bletz

[15] 3,676,817
[45] July 11, 1972

[54] ADJUSTABLE THERMOSTAT

[72] Inventor: Howard W. Bletz, Mansfield, Ohio

[73] Assignee: Therm-O-Disc Incorporated, Mansfield, Ohio

[22] Filed: Feb. 22, 1971

[21] Appl. No.: 117,443

[52] U.S. Cl............................337/347, 337/370, 337/372
[51] Int. Cl..............H01h 37/18, H01h 37/20, H01h 37/52
[58] Field of Search...................337/94, 347, 354, 360, 361, 337/368, 370, 371, 372, 375

[56] References Cited

UNITED STATES PATENTS

| 3,602,863 | 8/1971 | Place | 337/354 X |
| 3,573,700 | 4/1971 | Schmitt | 337/347 |
| 3,462,722 | 8/1969 | Bletz | 337/347 |
| 3,239,633 | 3/1966 | Bletz | 337/347 |
| 2,753,421 | 7/1956 | Mertler | 337/347 |

FOREIGN PATENTS OR APPLICATIONS

| 451,005 | 7/1936 | Great Britain | 337/347 |

*Primary Examiner*—Bernard A. Gilheany
*Assistant Examiner*—Dewitt M. Morgan
*Attorney*—McNenny, Pearne & Gordon

[57] ABSTRACT

An adjustable thermostat in which an adjusting spring applies an adjustable force to a bimetal snap disc. The adjusting spring is also formed of bimetal and its temperature induced forces add to the temperature induced forces of the disc so that the sum thereof is available for switch operation. The spring rate of the adjusting spring can be adjusted by moving a fulcrum lengthwise of the adjusting spring to provide the thermostat with the desired differential temperature in operation. Such differential temperature adjustment does not materially alter the temperature adjusting range provided by a cam which engages the end of the adjusting spring. The bimetal snap disc is supported in a cup element having cam surfaces along one side so that the position of the snap disc is adjusted by rotating the support cup, thus minimizing or reducing the necessity of selective fitting of the thermostat elements.

18 Claims, 6 Drawing Figures

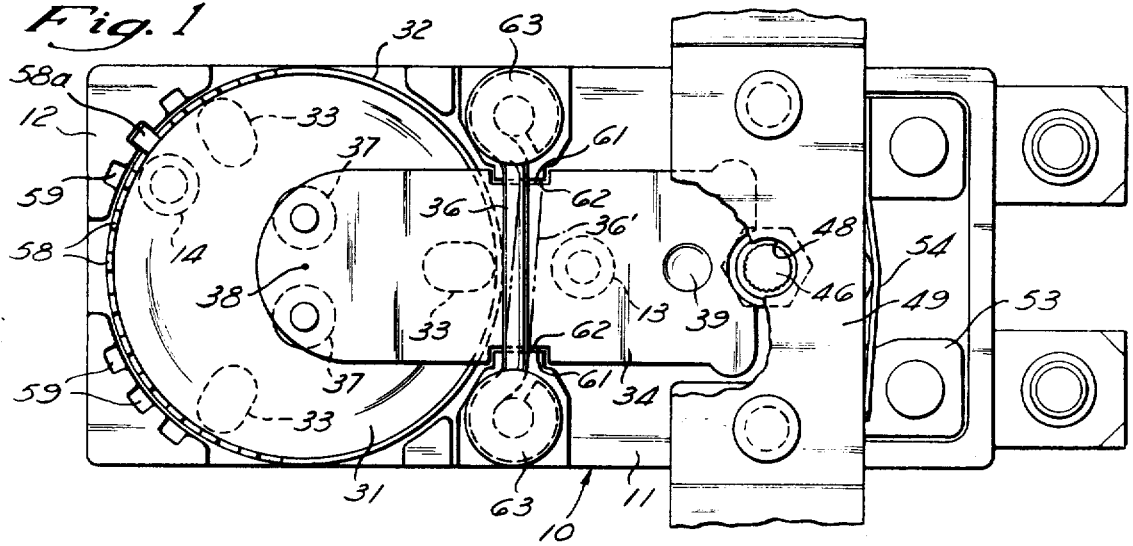
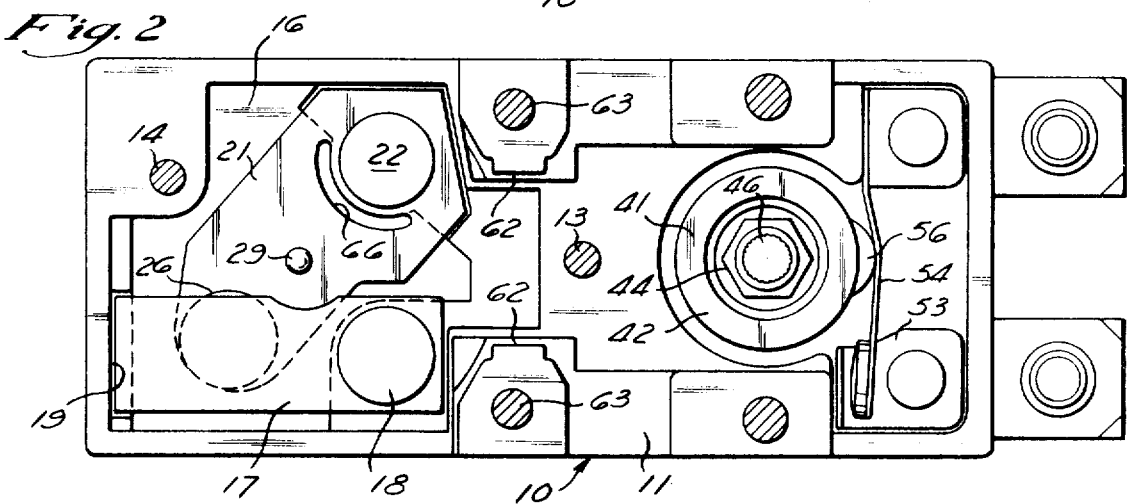
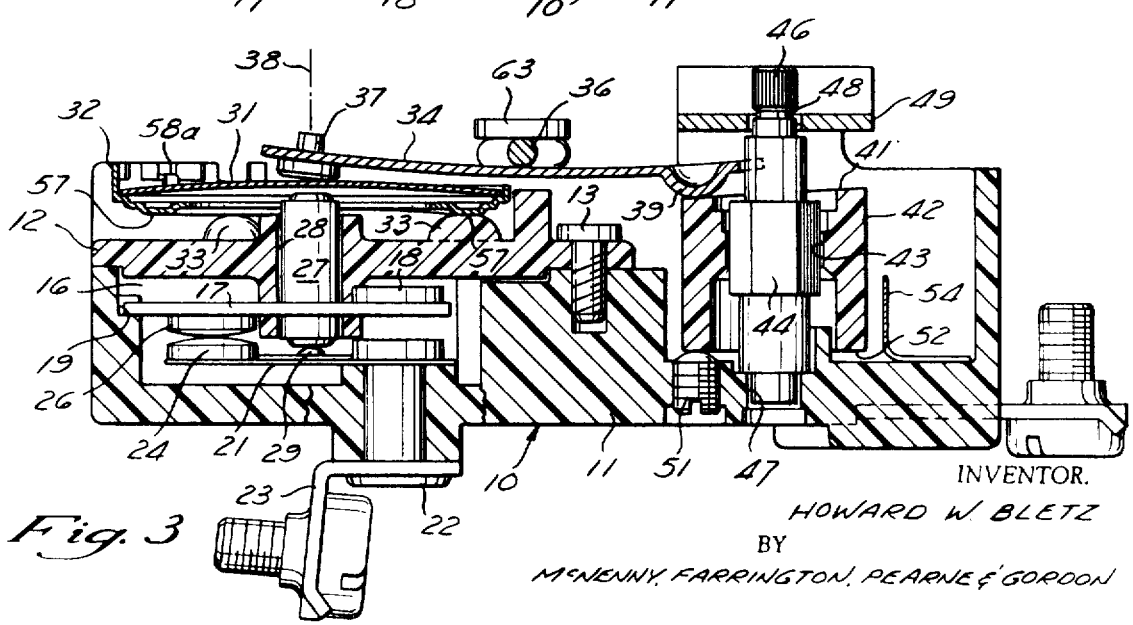

ADJUSTABLE THERMOSTAT

BACKGROUND OF THE INVENTION

This invention relates generally to adjustable bimetal operated thermostats and more particularly to a novel and improved adjustable thermostat operated by a bimetallic disc.

PRIOR ART

Adjustable thermostats which are operated by a thermal responsive bimetallic element are well known. For example, my United States Letters Patent No. 3,239,633 and the reissue thereof, Number Re. 26,554 disclose an adjustable thermostat in which the operator is a bimetal beam which responds to temperature and operates a switch mechanism. In such thermostat, the primary temperature adjustment is provided by a screw mechanism which acts against the bimetallic blade or beam. Another example of a bimetal operated adjustable thermostat is illustrated in the United States Letters Patent No. 3,573,700, Ser. No. 779,680, filed Nov. 29, 1968. This patent discloses a bimetal disc operated thermostat in which adjustable spring means are provided to adjust the operating characteristics of the discs. Such a device, in which a bimetal snap disc is utilized as the temperature responsive element, is preferable in many instances to a device utilizing a bimetal beam member since the thermally produced force change resulting from a given temperature change is greater in a disc than in a corresponding beam. Both of these patents are assigned to the assignee of the present invention.

SUMMARY OF THE INVENTION

The present invention has several important aspects. In accordance with one aspect of this invention, a single spring mechanism is utilized to provide adjustment of both the operating temperature of the thermostat and its differential temperature. Such spring mechanism applies a spring force to the disc to modify its operating temperature, and two separate adjustments are provided to separately control the character of such spring force. The first adjustment changes the force of the spring on the disc without changing the rate of the spring. Therefore, operation of the first adjustment does not alter the differential temperature of the disc, but merely adjusts the operating temperature. The second adjustment is arranged to adjustably change the spring rate of the force applied to the disc to provide adjustment of the differential temperature of disc operation. Such adjustment of temperature differential is obtained without materially altering the range of the first adjusting mechanism.

In accordance with another of the broader aspects of this invention, the temperature adjusting spring is also formed of bimetal. Both the bimetal disc and the bimetal adjusting spring respond to temperature and their responses are additive to increase the force available for switch operation caused by a given temperature change. Such structure is particularly desirable in thermostats which must operate with small temperature differentials.

In accordance with still another of the broader aspects of this invention, the disc is supported by an adjustable mechanism which is adjusted to insure proper switch operation while eliminating or minimizing the need for selective fitting or assembly of the thermostat components.

In the illustrated embodiment of this invention, a structure is provided in which these and other aspects of the invention materially contribute toward the improved operation of the thermostat. With the illustrated embodiment, selective assembly or fitting of the thermostat components are virtually eliminated, and adjustment is provided to compensate for variations in the sizes and shapes of the switch mechanism and the bumper operator. Such adjustment is provided by a disc support cup which supports the disc in a position determined by the adjustment thereof.

A single, bimetallic adjusting spring applies an adjustable force to the disc to control the temperature characteristics thereof. This adjusting spring is supported substantially at its center on a fulcrum which can be adjusted longitudinally of the spring to change the rate of the spring force applied to the disc. Such adjustment of the fulcrum provides adjustment of the differential temperature of operation of the thermostat.

A range cam mechanism engages the end of the adjusting spring remote from the disc and its operation changes the force of the adjusting spring on the disc without changing the spring rate of such force. Rotation of the cam, therefore, adjusts the operating temperature of the thermostat without modifying the differential temperature. Further, differential temperature adjustment achieved by the movement of the central fulcrum does not materially alter the range adjustment, so it is not necessary to selectively assemble or fit the temperature adjusting range cam.

BRIEF DESCRIPTION OF THE DRAWINGS

FIG. 1 is a plan view of a thermostat incorporating this invention with a portion of the mounting bracket broken away for purposes of illustration;

FIG. 2 is a plan view similar to FIG. 1 with parts removed to illustrate the switch structure;

FIG. 3 is a longitudinal section with portions illustrated in staggered planes to better illustrate the internal structure of the main switch mechanism;

DETAILED DESCRIPTION OF THE DRAWINGS

Figure 4:
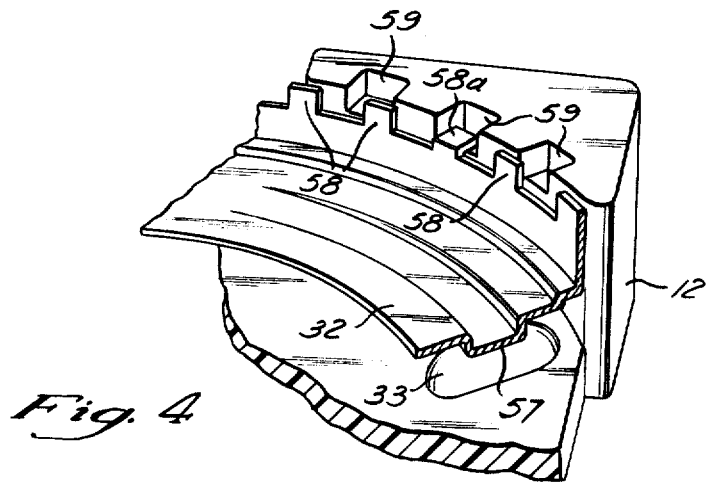
FIG. 4 is a fragmentary perspective view illustrating the adjustment structure provided by the disc support cup.

The United States Letters Patent No. 3,573,700 (supra), Ser. No. 779,680, discloses the manner in which the operating temperature of a bimetal snap disc can be adjusted by applying an adjustable biasing force to the disc. When such force is applied by spring in a manner in which the spring rate of the spring is not altered during adjustment, the operating temperature of the system is altered without changing the differential temperature of operation. Further, changes of the biasing spring force without changing the spring rate of such force does not significantly alter the snap range of the disc. On the other hand, the differential temperature in operation of a bimetal disc can be modified by altering the spring rate of the biasing force applied to the disc.

In the illustrated embodiment of the present invention, a novel and improved structure is provided in which adjustment of both the operating temperature of the system and the differential temperature in operation of the system are independently adjustable in a system wherein both adjustments function to modify the operation of a single adjustment spring. It is, therefore, not necessary to utilize two separate biasing springs to provide the two desired adjustment functions. In practice, the differential temperature adjustment is made during the manufacture of the thermostat and is not changed by the thermostat user. On the other hand, the operating temperature of the thermostat is adjusted by the user.

Referring to FIGS. 1 through 3, the illustrated thermostat includes a body assembly 10 consisting of a main body element 11 and a switch cover body element 12. These two body elements are preferably molded phenolic resin or the like and are connected together by a pair of drive fasteners 13 and 14. The two body elements cooperate to define a main switch chamber 16. A stationary contact arm 17 is mounted at one end on the main body 11 by a rivet 18 which electrically connects the stationary contact arm to an external terminal (not illustrated). The opposite end of the stationary contact arm 17 is positioned in a recess 19 formed in the main body element 11. The various elements are proportioned so that the free end of the stationary contact arm is biased into engagement with the surfaces provided by the recess 19 to insure exact location of the free end.

A movable contact arm 21 is supported on the main body element 11 at one end by a rivet 22 which electrically connects the movable contact arm 21 to an external terminal 23. The terminal 23 is similar to the terminal connected to the stationary contact arm 17 by the rivet 18. The movable contact arm is formed of relatively thin spring material and is shaped to extend diagonally across the switch chamber 16 to a free end located under the stationary contact arm 17. A movable contact 24 is mounted on the free end of the movable contact arm and is located for engagement with a fixed contact 26 mounted on the stationary contact arm 17. When the two contacts 24 and 26 are in engagement as illustrated in FIG. 3, the switch mechanism is closed and electrical continuity is provided therebetween. However, when the movable contact arm 24 is bent downwardly from the illustrated position, the contacts move apart opening the switch.

Switch operation is provided by a bumper 27 which is 21, respect longitudinally guided in an opening 28 formed in the switch cover body element 12. The lower end of the bumper 27 is positioned to engage a projection 29 formed on the movable contact arm 21, and the upper end is positioned in alignment with the center of a bimetal snap disc 31. The periphery of the snap disc 31 is supported in a disc support cup 32 which rests against three symmetrically positioned projections 33 formed on the switch cover body element 12. The disc support cup is adjusted in the manner described below to properly position the disc 1 with resPect to the upper end of the bumper 27.

The snap disc 31 provides two positions of stability between which it moves with snap action in response to temperature changes. When the disc is in the position of stability illustrated in FIG. 3, its center portion is spaced from the end of the bumper 27. Snap movement of the disc from this position of stability to its downward position of stability causes the central portion of the disc to engage the bumper 27, and, therefore, move the bumper in a downward direction as illustrated in FIG. 3 causing the switch to open. Snap movement back to the illustrated position causes the switch to close. The disc support cup 32 is adjusted to provide lost motion to insure that the switch is opened only after the disc is in snap motion. This structure insures that full contact pressure is maintained until the instant the switch opens and is reestablished the instant the switch closes.

A beam type spring 34 is supported at approximately its center by a wire fulcrum element 36 and extends at one end to a position over the disc 31. A pair of low friction buttons 37, preferably formed of a plastic material such as a phenolic resin or the like, are mounted in the free end of the spring 34 to engage the side of the disc 31 remote from the bumper 27 at two locations substantially symmetrically arranged with respect to the center axis 38 of the disc. In the illustrated embodiment, a substantial force is applied to the disc. The two buttons 37 are provided to distribute the force and prevent it from causing an objectionable deformation of the disc.

The other end of the spring 34 is formed with a projection 39 which engages a cam surface 41 on a rotatable range cam 42. The various elements are proportioned so that the cam surface 41 produces an upward force on the adjacent end of the spring 34 which results in a downward force on the disc 31 at the two buttons 37. The value of the force of the spring on the disc is controlled by the position of the cam 42.

The range cam 42 is formed with a central hexagonal opening 43 proportioned and sized to receive a mating hexagonal section 44 on a control stem 46. The control stem 46 is supported at its lower end within an opening 47 formed in the main body element 11 and at its upper end by an opening 48 in a mounting bracket 49. With this structure, the rotational position is controlled by the stem 46, however, the cam is free to move with respect to the stem in a direction along the axis thereof. A calibration screw 51 is threaded into the main body element 11 in alignment with the projection 39 and engages an end face 52 on the cam 42 to determine the axial position of the cam with respect to the body. The force of the spring 34 maintains engagement between the end of the calibration screw 51 and the cam. A cam of this type is disclosed in my United States Letters Patent No. 3,462,722. A secondary switch mechanism including a fixed contact 53 and a mobile contact arm 54 is mounted in the body and is operated by a radial lobe 56 on the cam 42 when the cam is rotated to the position illustrated in FIG. 2.

Referring to FIG. 4, the disc support cup 32 is adjustable to move the disc 31 along the axis 38 and provide the proper positioning of the disc for the elements of the switch mechanism and bumper of the particular thermostat. This adjustment eliminates or minimizes the necessity of selective fitting or assembly of the parts of the thermostat and provides a means for compensating for variations between the dimensions of the elements created by manufacturing tolerances. The disc support cup 32 is formed with three symmetrically positioned camming surfaces 57 which are inclined downwardly from its lower surface of the cup. Each camming surface 57 engages one of the projections 33. By rotating the disc cup 32, the cams are moved with respect to their associated projections causing axial movement of the support cup with respect to the base assembly. Such adjustment thereby adjusting determines the position of the periphery of the disc 31 with respect to the adjacent end of the bumper 27. Since three cams and three projections are provided, the cams provide full positioning of the disc support. In the illustrated embodiment, the spring 34 exerts a sufficient force on the disc, in all positions of the disc, to maintain the disc against the cup 32 and in turn maintain the cup 32 against the projections 33. Therefore, separate mounting means are not required.

The disc cup is provided with a plurality of spaced projectionS 58 which extend upwardly therefrom at spaced locations and are proportioned to be bent down into an aligned opening 59 in the body assembly as shown at 58a. The projections 58 are spaced from each other by an angular distance which differs from the spacing of the openings to provide a vernier type cooperation. With this type structure, at least one projection is aligned with an associated recess in substantially all rotational positions of the cup. Cup adjustment is provided by rotating the cup until the desired position is reached. One of the projections 58 is then bent into an aligned opening 59, and the disc support cup is locked against further movement.

The adjustment of the differential temperature of operation is provided by bending the fulcrum wire 36 either toward or away from the disc end of the spring 34. Referring to FIG. 1, the spring 34 is formed with two opposed recesses 61 approximately in the center along the length of the spring. These recesses 61 mate with associated projections 62 formed on the main body element 11 to axially locate the spring and maintain its proper alignment. The fulcrum wire 36 is supported at its end by two rivet fasteners 63 and is provided with a loop at each end extending around the shank of such fasteners. When it is desired to move the fulcrum away from the disc, the fulcrum wire 36 is bent preferably only at one end so that it extends diagonally across the spring 34 as illustrated in phantom at 36'. If greater amount of adjustment in this direction is required, the opposite end of the fulcrum wire is bent to also move it away from the disc end of the spring. If, on the other hand, adjustment in the opposite direction is required, the fulcrum wire is bent again preferably at one end in a direction toward the disc. Here again, the opposite end may also be bent in the same direction if greater adjustment is required.

Figure 5:
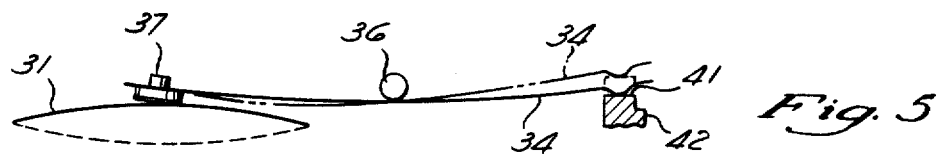
FIG. 5 is a schematic view illustrating the manner in which the operating temperature of the thermostat is adjusted.
Figure 6:
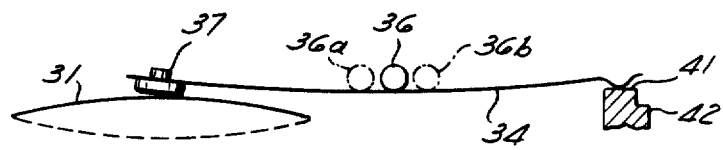
FIG. 6 is a schematic view similar to FIG. 5 illustrating the manner in which the differential temperature of the thermostat is adjusted.

Reference may be made to FIGS. 5 and 6 for a clear understanding of the manner in which the spring 34 is adjusted to provide separate adjustments for both operating temperature and differential temperature. In these schematic views, similar reference numerals are utilized to designate similar parts. First, it should be understood that the relationship between the positive spring rate provided by the spring 34 and the negative spring rate provided by the snap disc determines for a given spring system the operating differential temperature of the disc. When a disc is manufactured, it has a differential temperature of operation in the free state determined by the material used to form the disc and the shape of the disc produced during manufacture. For example, a typical disc may snap from one position of stability in its free state upon reaching a temperature of 50° F. and snap back upon reaching a temperature of 70° F. Such disc, in its free state, has a 20° differential temperature and operating temperatures of 50° F. and 70° F. If the disc is biased toward one position of stability with a spring force having a positive spring rate having an absolute value less than the negative spring rate, the differential temperature of operation is reduced. The amount of reduction of differential temperature is greater when the absolute value of the positive spring rate of the biasing force is increased. If the positive spring rate of the biasing force were to equal the absolute value of the negative spring rate of the disc, the disc will loose its snap characteristics and, of course, the differential temperature in operation would become zero. Such a system would not be utilized, however, since the snap action would not exist. On the other hand, the differential temperature of the disc can be adjustably reduced if the absolute value of the positive spring rate of the biasing force can be adjusted.

In the illustrated embodiment, the fulcrum wire 36 can be moved toward or away from the disc end of the spring 34 from a position approximately mid-way along the length of the spring. When the fulcrum wire is moved toward the disc end of the spring as represented by the phantom position 36a in FIG. 6, the absolute value of the positive spring rate of the force applied to the disc 31 by the spring 34 is increased, and the differential temperature of the snap operation of the system is, therefore, decreased. On the other hand, movement of the fulcrum wire 36 in a direction away from the disc end of the spring 34, as represented by the phantom position 36b, decreases the absolute value of the positive spring rate of the force applied to the disc by the spring 34 causing an increase in the differential temperature of the disc. Therefore, adjustment of the differential temperature of the illustrated thermostat is obtained by moving the fulcrum wire 36 toward or away from the disc end of the spring 34.

The operating temperature of the disc, in its free state as mentioned previously, is determined by the material used to form the disc and its shape. Such operating temperature, however, can be changed by applying a spring force to the disc which biases it toward one of the positions of stability. So long as the spring rate of the force applied to the disc does not vary, adjustment of the spring force does not affect the differential temperature of the system or its snap range, but merely the operating temperature. In the illustrated embodiment, rotation of the cam 42, which is provided with an inclined cam surface 41, raises or lowers the end of the spring 34 remote from the disc 31 and thereby changes the force applied to the disc. Such adjustment does not, however, change the spring rate of such force, and therefore, does not alter the operating temperature differential for a given setting or position of the fulcrum 36. In the illustrated structure, the total length of the spring is not changed by adjustment of the location of the fulcrum spring. Therefore, small adjustments of the fulcrum, while it remains close to the center of the spring, do not produce significant changes in the range of adjustment of the spring. It has been found in actual practice that when the sPring is of substantially uniform cross section as illustrated, the range adjustment is not materially altered by fulcrum adjustment and that the rate of change of the spring force applied to the disc by the spring 34 with respect to movement of the remote end of the spring by the cam surface 41 is not significantly altered, so long as the fulcrum is located close to the center of the spring. Consequently, the range or change in operating temperature for a given displacement of the cam end of the spring 34 remains substantially constant even though the fulcrum 36 is adjusted lengthwise of the spring between positions close to the center of the spring. For this reason, it is not necessary to vary the angle of the cam face 41 to compensate for adjustment of position of the fulcrum wire 36.

The assembly and adjustment of the illustrated thermostat is as follows. After the switch elements are mounted in the switch cavity 16, the switch cover body element is mounted in position, and the bumper 27 is positioned in the opening 28. Subsequently, the disc support 32 and the disc 31 are positioned in place. After the remainder of the thermostat elements are assembled, the disc support ring 32 is rotated to move the disc toward or away from the switch mechanism to compensate for variations in the dimensions of the particular elements of the system caused by manufacturing tolerances. Once the support ring 32 is properly positioned to insure that the switch contacts open and close in substantially mid-point of the snap range of the disc, the appropriate projection 58 is bent into an aligned opening 59 to lock the disc support cup in its adjusted position.

The spring 34 is formed of a material having a spring rate when the fulcrum wire 36 is located at approximately its center which will produce a differential temperature of operation for the system approximating the desired differential temperature. The differential temperature of the system is then determined to establish whether adjustment of the fulcrum is required to provide the desired differential temperature of operation for the device. If it is determined that the differential temperature in operation is too great, the fulcrum wire 36 is bent to move the effective fulcrum toward the disc end of the spring 34, and thereby reduce the differential temperature of operation. Preferably, the fulcrum wire is bent first at one end so that it extends across the spring at a slight angle, since such adjusting method provides greater adjustment movement for a given decrease in differential temperature in operation than would result if both ends were bent simultaneously. If, on the other hand, it is determined in the initial measurement of the operating differential temperature that the differential is too low, the fulcrum wire is bent to move the effective location of the fulcrum away from the disc end of the spring 34.

When the desired differential temperature of operation is achieved, the operating temperature of the disc is determined at a given rotational position of the cam 42. If the temperature is too high in a thermostat wherein the operation of the spring is used to reduce operating temperature, the calibration screw 51 is threaded in to increase the force of the spring on the disc for the particular rotational position of the cam. Of course, if an increase in operating temperature is required in such a system, the calibration screw 51 is threaded out to reduce the force.

Because the adjustment of the location of the fulcrum when it is close to the center of the spring does not significantly alter the change in force of the spring 34 on the disc 31 for a given amount of movement of the cam end of the spring, it is merely necessary to select a cam having a rise angle which, when used with the spring 34, produces the desired change in force of the spring on the disc in response to a given amount of rotation of the cam.

In the preferred embodiment, the spring 34 is formed of bimetal so that changes in temperature of the spring 34 will produce a change in the force of the spring on the disc to assist the disc in operating the switch. This is particularly desirable when a thermostat is required to operate at relatively low temperature differentials in the order of 2° F. − 5  F. In such a system where both the disc 31 and the spring 34 are formed of bimetal, they both produce force changes in response to changes in temperature. In the preferred embodiment, the elements are assembled so that these force changes are additive, and the sum of the changes in force created by temperature change of both the disc and the spring 34 are available for the operation of the switch. Further, in such a system where low differential temperatures are required, the spring rate of the movable contact arm should be relatively low so that it does not stall the disc when the lost motion is taken up and the disc commences to open the switch. For this reason, the movable contact arm is preferably formed with an arcuate cutout section 66 adjacent to the rivet 22 so that the arm can be moved with a relatively small force and tends to bend with a hinge-like action along a line at the ends of the cutout 66. Such a structure, however, provides sufficient material beyond the ends of the cutout 66 to carry substantial currents.

It has been found in actual practice that a thermostat in accordance with the present invention can be adjusted to have very low operating differential temperatures in the order of 2° F. − 5° F. while still providing sufficient thermally induced force to adequately operate the switch mechanism even under relatively high loading conditions. Further, it has been found that because the switch operates after the disc is in snap movement and, consequently, the switch retains substantially full contact pressure until the instant it opens, the contact life is improved, and the thermostat is capable of operating through many cycles satisfactorily even when operating with relatively large induction loads.

Although a preferred embodiment of this invention is illustrated, it should be understood that various modifications and rearrangement of parts may be resorted to without departing from the scope of the invention disclosed and claimed herein.

What is claimed is:

1. An adjustable thermostat comprising a body assembly, a bimetallic snap disc in said body assembly having an operating portion movable with snap action between first and second positions of stability in response to temperature changes, said disc having a negative spring rate between said positions, switch means on said body assembly operatively connected to said operating portion of said disc opening and closing in response to movement of said portion between said positions, an adjustable spring means having a positive spring rate applying a spring force to said snap disc in all positions of said portion between said first and second positions urging said portion toward said first position, said adjustable spring means including first adjustment means operable to change the value of said positive spring rate, and second adjustment means operable to change the value of said spring force, said positive spring rate having an absolute value less than the absolute value of said negative spring rate of said disc.

2. An adjustable thermostat as set forth in claim 1 wherein said thermostat is free of positive restraints limiting the movement of said portion between said first and second positions.

3. An adjustable thermostat as set forth in claim 2 wherein said disc is supported at its periphery in said body assembly and said portion of said disc is the central portion thereof.

4. An adjustable thermostat as set forth in claim 3 wherein adjustment of said first adjustment means has substantially no affect on the operation of said second adjustment means.

5. An adjustable thermostat as set forth in claim 4 wherein adjustment of said second adjustment means has substantially no affect on said positive spring rate of said spring means.

6. An adjustable thermostat as set forth in claim 5 wherein said spring means provides a single spring and said first and second adjusting means both adjust said single spring.

7. An adjustable thermostat as set forth in claim 6 wherein said spring means provides a leaf spring, one end of which is operatively connected to said central portion of said disc for applying said spring force thereto, said first adjustment means engages said spring intermediate its ends, and said second adjustment means engages the other end of said spring, said first adjustment means being adjustable lengthwise of said spring and said second adjustment means being adjustable in a direction substantially normal to said spring.

8. An adjustable thermostat as set forth in claim 7 wherein said leaf spring is formed of bimetal material arranged so that the thermally induced force of said spring augments the thermally induced force of said disc.

9. An adjustable thermostat as set forth in claim 1 wherein adjustment of said first adjustment means has substantially no affect on operation of said second adjustment means.

10. An adjustable thermostat as set forth in claim 9 wherein adjustment of said second adjustment means has substantially no affect on said positive spring rate of said spring.

11. An adjustable thermostat as set forth in claim 10 wherein said spring means provides a single spring and said first and second adjustment means both adjust said single spring.

12. An adjustable thermostat as set forth in claim 11 wherein said spring means provides a leaf spring, one end of which is operatively connected to said central portion of said disc for applying said spring force thereto, said first adjustment means engages said spring intermediate its ends, and said second adjustment means engages the other end of said spring, said first adjustment means being adjustable lengthwise of said spring and said second adjustment means being adjustable in a direction substantially normal to said spring.

13. An adjustable thermostat as set forth in claim 12 wherein said leaf spring is formed of bimetal material arranged so that the thermally induced force of said spring augments the thermally induced force of said disc.

14. A thermostat comprising a body, switch means on said body, a bimetallic snap disc on said body movable with snap action between two positions of stability, operator means operably connected between said disc and switch means operating said switch means in response to movement of said disc, and a bimetal spring on said body, said bimetal spring and said bimetal disc each producing a force change in response to temperature changes thereof, said bimetal spring and bimetal disc being interconnected so that said force changes are additive and the sum thereof is available for the operation of said switch means.

15. A thermostat as set forth in claim 14 wherein said bimetal spring is connected to apply a spring force to said disc, and first adjustment means are provided to adjust said spring.

16. A thermostat as set forth in claim 15 wherein said first adjustment means adjusts the spring rate of said spring force applied to said bimetal disc.

17. A thermostat as set forth in claim 15 wherein said first adjustment means adjusts the spring force of said spring applied to said disc.

18. A thermostat as set forth in claim 17 wherein second adjustment means are provided to adjust the spring rate of the spring force applied to said disc by said spring without materially altering the range of said first adjustment means.

* * * * *

UNITED STATES PATENT OFFICE
CERTIFICATE OF CORRECTION

Patent No. 3,676,817　　　　　　　Dated　July 11, 1972

Inventor(s)　Howard W. Bletz

It is certified that error appears in the above-identified patent and that said Letters Patent are hereby corrected as shown below:

Column 3, lines 17 and 18, after "which is " -- 21, respect -- should be deleted.

Column 3, line 27, "1" should read -- 31 -- .

Column 3, line 27, "resPect" should read -- respect -- .

Column 4, line 22, "adjusting" should read -- adjustably -- .

Column 4, lines 30 and 31, "projectionS" should read -- projections -- .

Column 6, line 59, "5" should read -- 5°F. -- .

Signed and sealed this 5th day of November 1974.

(SEAL)
Attest:

McCOY M. GIBSON JR.　　　　　　C. MARSHALL DANN
Attesting Officer　　　　　　　 Commissioner of Patents